3,485,608
SLURRY FOR POLISHING SILICON SLICES
Olin B. Cecil, Richardson, Tex., assignor to Texas Instruments Incorporated, Dallas, Tex., a corporation of Delaware
No Drawing. Filed Jan. 2, 1968, Ser. No. 694,803
Int. Cl. C04b 31/16
U.S. Cl. 51—308                                        3 Claims

ABSTRACT OF THE DISCLOSURE

A polishing slurry for polishing silicon slices which includes a water slurry containing about 10 to 15 weight percent particulate silicon dioxide, titanium dioxide (anatase) in an amount from about 1.0 to 5.0 weight percent based on the water slurry and a sufficient quantity of a base to adjust the pH of the polishing slurry to a pH from about 9 to 12. The silica particles are preferably about 30 millimicrons in diameter and the titanium dioxide (anatase) particles are preferably in 30 to 300 millimicron diameter range.

---

This invention relates to polishing materials, and particularly, but not by way of limitation, to polishing slurries for semiconductor slices. In the manufacture of semiconductor devices, it is common to cut slices from a single crystal boule of a semiconductor material, such as silicon. Slices are commonly about 10 mils in thickness and are affixed to a polishing block by a cerese wax or beeswax. The exposed surface of the slice is then polished to remove irregularities in the surface which are created as the slice is cut from the bulk single crystal material. Ordinarily the slice, after mounting on the polishing block, is sequentially polished with abrasives having differing particle sizes. Specifically, the slice is usually subjected to a "Blanchard grind" which removes the larger irregularities in the surface in a rather rapid manner. The slice is then subjected to a "rough polish" which, though slower than the "Blanchard grind," produces a finer finish on the surface. The slice is then subjected to a "final polish" the purpose of which is to provide an extremely smooth, defect free surface which may then be subsequently treated by various processes known to those skilled in the art to produce semiconductor.

Since the polished surface of the silicon slice may be later exposed to masking and etching treatments, it is extremely important that the surface of the slice be as free of scratches and irregularities as possible. For the purpose of providing a finely polished surface, many abrasive slurries have been compounded and used. Prior abrasives which have been used in the "final polishing" process include aluminum oxide, cerium oxide, cupric ion, diamond, silicon dioxide, zirconium oxide, and silica sols and gels. It is common to adjust the pH of polishing slurries with an inorganic alkaline material, such as sodium hydroxide, to a pH between about 9 and 12 in order to accomplish both a chemical and mechanical polishing of the silicon surface. Procedures, such as described above, relating to polishing of silicon are described in Mendel, Polishing of Silicon, SCP and Solid State Technology, p. 27 (August 1967). Procedures employed by others and description of various polishing slurries may also be found in U.S. Patents 2,744,001; 3,029,160; 3,071,455; 3,170,273; and 3,328,141.

With polishing slurries using only silicon dioxide as the particulate abrasive material, scratches develop on the surface of the silicon slice which are believed to be caused by the abrasive. These scratches cannot be removed regardless of the length of the polishing period. Silicon dioxide has a Moh's hardness of 7, which is rather close to that of silicon. Thus, while silicon dioxide is a desirable abrasive due to the relatively fast polishing rate, it does produce some scratching of the silicon surface. If a softer abrasive is used, such as titanium dioxide which has a Moh's hardness of 6 to 6½ for rutile grade and 5½ to 6 for anatase, the polishing rate is too slow.

The present invention provides a polishing slurry which provides a polishing rate comparable to that of silicon dioxide slurries, but which produces a surface free from defects which are of any concern.

The invention may be generally described as a polishing slurry for silicon slices which consists of a water slurry containing about 10 to 15 weight percent particulate silica, titanium dioxide (anatase) in an amount from about 1.0 to 5.0 weight percent, based on the water slurry, and a sufficient quantity of an alkaline material to adjust the pH of the polishing slurry to a pH from about 9 to 12.

To be more specific reference is made to the following example.

EXAMPLE I

On a conventional 6¾ inch O.D. polishing block were mounted 8 silicon slices each having an O.D. of 1.5 inches. The slices were in a convention manner subjected to a "Blanchard grind" and a "rough polish" to prepare them for the "final polish." For the "final polish," 388 grams of a water slurry containing approximately 10 weight percent silica ($SiO_2$), which slurry is marketed under the trademark "Syton" by the Monsanto Company, 12 grams titanium dioxide (anatase) and sufficient sodium hydroxide to adjust the pH of the slurry to 9.9 were blended together. Microcloth was mounted on the polishing head of a conventional silicon slice polishing apparatus and the slurry mixture, after initial wetting of the Microcloth with the slurry, was periodically added for periods of 5 seconds during each minute in sufficient quantity to keep the pad in a wet condition. The Microcloth was brought into contact with the surface of the silicon slices for a period of 15 minutes under a force of 17 pounds. After the silicon slices had been polished for 15 minutes, the slices were removed and subjected to a "Sirtl etch," which, as is known to those skilled in the art, is a mixture of chromic acid, hydrofluoric acid and water. Slices after the polishing and a two minute "Sirtl etch" reveal an extremely smooth surface free of scratches normally observed in etching under identical conditions, but with a slurry consisting only of Syton and sufficient sodium hydroxide to adjust the pH of the Syton to 9.9. The polishing machine machine was conventional in design and included a polishing head which rotated at about 100 r.p.m. with the polishing block moving in the opposite direction at about 150 r.p.m.

Table I below details other tests run with slurries of the present invention.

TABLE I

| Syton (grams) | Titanium dioxide (Anatase) (grams) | Polishing pad | Polishing head weight (pounds) | pH | Polishing time, minutes |
|---|---|---|---|---|---|
| 388 | 12 | Microcloth | 17 | 9.9 | 7.5 |
| 491 | 9 | do | 17 | 9.9 prior to addition of TiO$_2$. | 20.0 |
| 388 | 12 | Corfam | 17 | do | 15.0 |
| 388 | 12 | Microcloth | 17 | 9.9 | 30.0 |
| 495 | 5 | do | 17 | 9.9 | 30.0 |

The surface resulting from the polishing conducted in accordance with the criteria of Table I were all extremely smooth, commercially acceptable surfaces.

The water slurry used in the above example and in the test detailed in Table I contains silica particles having a mean diameter of about 30 millimicrons. The weight percent of silica in the Syton slurry can vary between 10 and 15 weight percent depending upon the batch from which the material is selected. The titanium dioxide (anatase) particles range in particle size from about 30 to 300 millimicrons with the major portion of the particles lying in the 100 to 125 millimicron range.

It is believed that the larger titanium dioxide particles serve as a shock absorber to prevent the silica particles from becoming bound between the polishing cloth and the surface of the silicon under excessive pressures and thus producing scratches in the surface of the silicon slice. The silica particles are nevertheless free to contact the surface of the silicon to provide the abrasive action as the quantity of titanium dioxide is relatively minor, i.e., on the order of 1.0 to 5.0 percent by weight of the quantity of silica present.

While rather specific terms have been used to describe one embodiment of the invention, they are not intended, nor should they be construed as a limitation upon the invention as defined in the following claims.

What is claimed is:
1. A polishing slurry for silicon slices which consists of:

a water slurry containing about 10 to 15 weight percent particulate silica;

titanium dioxide, anatase, in an amount from about 1.0 to 5.0 weight percent, based on the water slurry; and a sufficient quantity of an alkaline material to adjust the pH of the polishing slurry to a pH from about 9 to 12.

2. The slurry of claim 1, wherein:

the titanium dioxide particles have a particle size distribution between about 30 and 300 millimicrons.

3. The slurry of claim 1, wherein said titanium dioxide comprises about 3 percent by weight based on the water slurry containing the silica.

References Cited

UNITED STATES PATENTS

| | | | |
|---|---|---|---|
| 2,973,246 | 2/1961 | Harman et al. | 51—309 |
| 3,170,273 | 2/1965 | Walsh et al. | 51—308 |
| 3,328,141 | 6/1967 | Lachapelle | 51—309 |
| 3,388,982 | 6/1968 | Foster | 51—309 |
| 3,425,870 | 2/1969 | Marsh | 51—309 |
| 3,429,080 | 2/1969 | Lachapelle | 51—309 |

DONALD J. ARNOLD, Primary Examiner

U.S. Cl. X.R.

51—293, 309